UNITED STATES PATENT OFFICE.

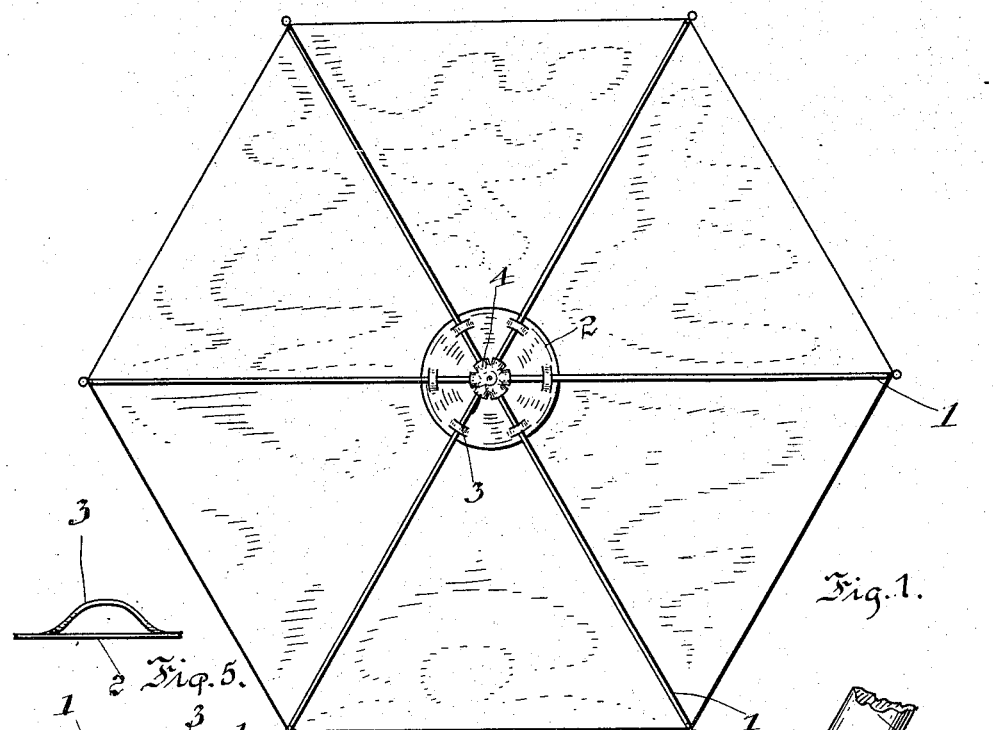
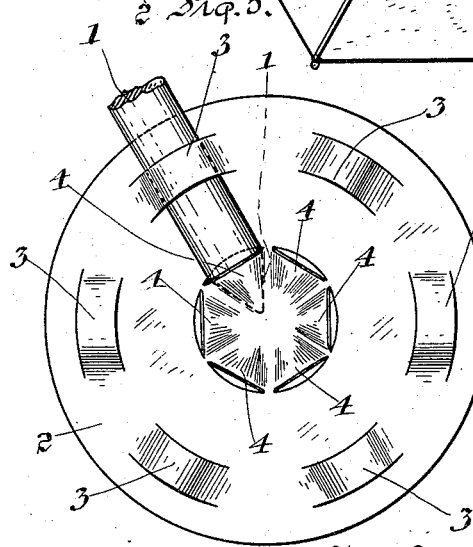
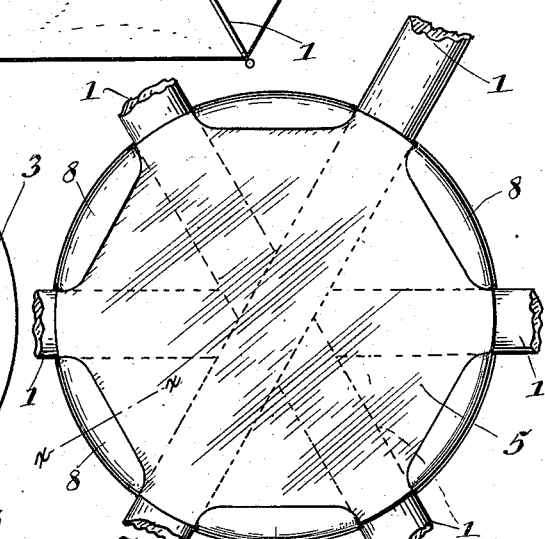
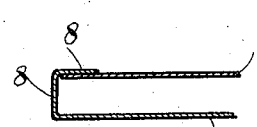

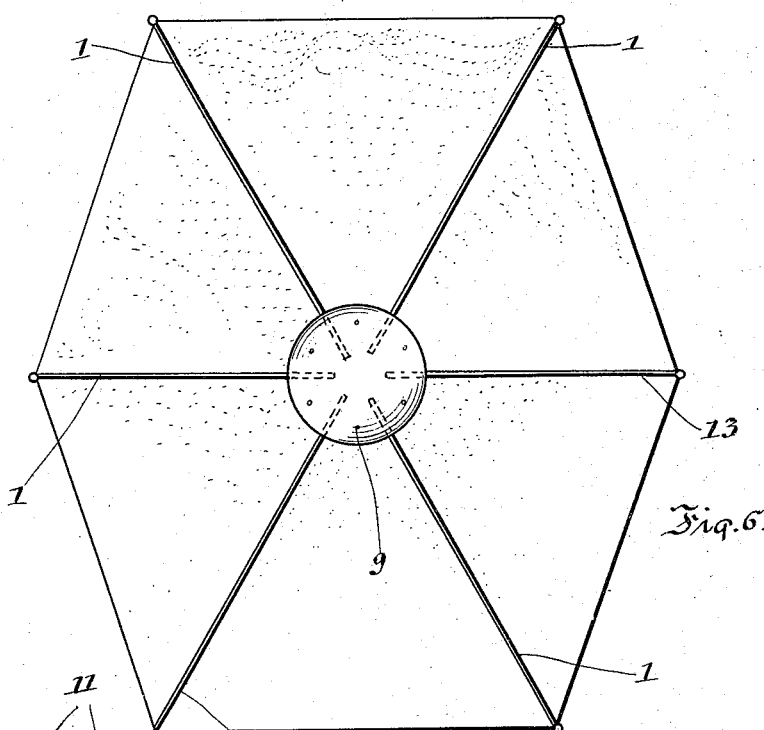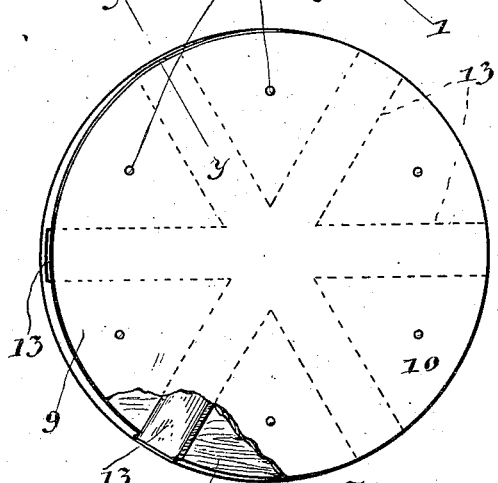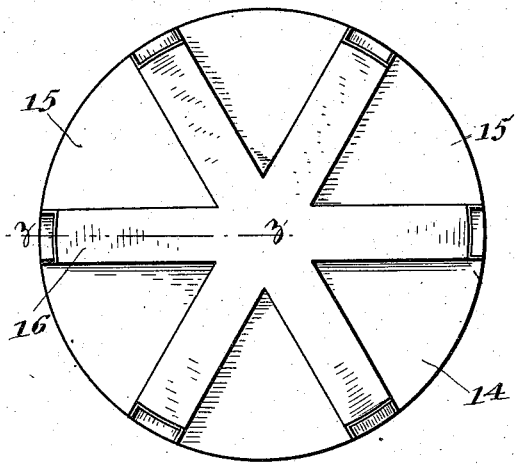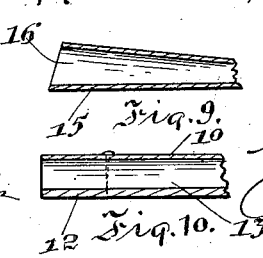

JOHN P. BUENGERS, OF RACINE, WISCONSIN.

KITE.

1,014,369.  Specification of Letters Patent.  Patented Jan. 9, 1912.

Application filed June 26, 1911. Serial No. 635,489.

*To all whom it may concern:*

Be it known that I, JOHN P. BUENGERS, a citizen of the United States, and a resident of the city of Racine, county of Racine, and State of Wisconsin, have invented certain new and useful Improvements in Kites, of which the following is a specification.

My invention relates to improvements in kites, the object being to provide a kite center-piece of such a design and construction that a kite may be expeditiously formed thereon.

A further object of my invention is to provide a kite center-piece which shall be simple of construction, safe and durable, and efficient in operation.

Other objects will appear hereinafter.

My invention consists in the combination and arrangements of parts hereinafter described and claimed.

My invention will be best understood by reference to the accompanying drawings forming a part of this specification, and in which, Figure 1 is a top plan view of a kite embodying my invention in its preferred form, Fig. 2 is a detail top plan view showing a metallic center-piece, Fig. 3 is a top plan view showing a modified form of center-piece, Fig. 4 is a section taken on line $x$—$x$ of Fig. 3, Fig. 5 is a detail elevation showing the conformation of loops of the center-piece shown in Fig. 2, Fig. 6 is a top plan view of a modified form of kite, Fig. 7 is a detail perspective view showing a modified form of center-piece, Fig. 8 is a detail perspective view showing another modified form of center-piece, Fig. 9 is a section taken on line $z$—$z$ of Fig. 8, and Fig. 10 is a section taken on line $y$—$y$ of Fig. 7.

The preferred form of construction as illustrated in the accompanying drawings comprises a kite having a plurality of radial arms 1 which are secured in a center-piece 2 as shown in detail in Fig. 2. This center-piece is a sheet metal stamping and is preferably circular in form. A plurality of loops 3 are struck up in the stamping adjacent the periphery thereof for the reception of the radial arms 1 as illustrated in Fig. 1. In this manner the arms 1 are supported, and in order to reinforce the inner extremities of said arms a plurality of struck up portions 4 are provided which correspond with the portions 3 as illustrated in Fig. 2. The inner ends of the arms 1 are pointed as indicated by dotted lines and are adapted to fit the portions 4 as indicated. When the peripheral cord passing around the kite is under tension, the arms 1 are held securely in the sockets or portions provided therefor, thus providing a secure and rigid frame. A modified form of center-piece 5 as shown in Fig. 3 comprises a sheet metal disk 6 and a circular member 7 having upwardly and inwardly turned flanges 8 which embrace said disk as clearly illustrated in the sectional view in Fig. 4. The arms 1 in this construction are passed into the space between the disk 6 and member 7, the inner ends of said arms being jointed together as indicated by dotted lines in Fig. 3.

The modified form of kite as shown in Fig. 6 comprises a modified form of center-piece 9 which consists of a sheet metal disk 10 which is secured by means of a plurality of nails or screws 11 to a body piece 12, the latter being preferably formed of wood and provided with a plurality of radial grooves 13 for the reception of the arms 1. The arms 1 in this construction meet at the center of the center-piece 9 at the juncture of the radial grooves 13.

The modified form of center-piece 14 as shown in Fig. 8 consists of a sheet metal disk 15 to which is soldered a series of channel sockets 16 which are disposed radially as clearly illustrated. These sockets 16 meet at the center, the resulting form being star shaped. The arms 1 are rigidly secured in the radial sockets thus formed in this center-piece.

Center-pieces constructed as set forth are symmetrical in design, strong and durable, and serve their functions in an efficient manner.

While I have illustrated and described the preferred forms for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A kite center-piece, comprising a circular disk of sheet metal, equally spaced struck-up loops formed in said disk adjacent the periphery thereof, and a series of centrally disposed sockets stamped in the center of said disk and arranged in radial alinement with said loops, substantially as described.

2. In a kite center-piece, a disk, a plurality of equally spaced struck-up loops formed in said disk adjacent to the periphery thereof, an equal number of sockets nearer the center of said disk, and an equal number of kite-frame members in said loops and sockets, substantially as described.

In testimony whereof I have signed my name to this specification in the presence of two subscribing witnesses.

JOHN P. BUENGERS.

Witnesses:
HELEN F. LILLIS,
JOSHUA R. H. POTTS.

Copies of this patent may be obtained for five cents each, by addressing the "Commissioner of Patents, Washington, D. C."